United States Patent
Fang et al.

(10) Patent No.: US 11,775,611 B2
(45) Date of Patent: Oct. 3, 2023

(54) PIECEWISE QUANTIZATION FOR NEURAL NETWORKS

(71) Applicant: Samsung Electronics Co., Ltd., Suwon-si (KR)

(72) Inventors: Jun Fang, Santa Clara, CA (US); Joseph H. Hassoun, Los Gatos, CA (US); Ali Shafiee Ardestani, San Jose, CA (US); Hamzah Ahmed Ali Abdelaziz, San Jose, CA (US); Georgios Georgiadis, Porter Ranch, CA (US); Hui Chen, Irvine, CA (US); David Philip Lloyd Thorsley, Morgan Hill, CA (US)

(73) Assignee: SAMSUNG ELECTRONICS CO., LTD.

( * ) Notice: Subject to any disclaimer, the term of this patent is extended or adjusted under 35 U.S.C. 154(b) by 273 days.

(21) Appl. No.: 16/816,247

(22) Filed: Mar. 11, 2020

(65) Prior Publication Data

US 2021/0133278 A1 May 6, 2021

Related U.S. Application Data

(60) Provisional application No. 62/929,752, filed on Nov. 1, 2019.

(51) Int. Cl.
*G06F 17/18* (2006.01)
*G06N 3/02* (2006.01)
(Continued)

(52) U.S. Cl.
CPC ............... *G06F 17/18* (2013.01); *G06N 3/02* (2013.01); *G06N 3/04* (2013.01); *G06N 3/08* (2013.01)

(58) Field of Classification Search
CPC ............ G06N 3/04; G06N 3/06; G06N 3/063; G06N 3/08; G06N 3/082; G06F 7/38;
(Continued)

(56) References Cited

U.S. PATENT DOCUMENTS

| 2017/0308789 A1 | 10/2017 | Langford et al. |
| 2019/0042935 A1 | 2/2019 | Deisher |

(Continued)

FOREIGN PATENT DOCUMENTS

| EP | 3543917 A1 | 9/2019 |
| WO | 2019006976 A1 | 1/2019 |

OTHER PUBLICATIONS

R. Zhao et al., Improving Neural Network Quantizing without Retraining using Outlier Channel Splitting, arXiv:1901.09504v3 [cs.LG] May 22, 2019 (Year: 2019).*

(Continued)

*Primary Examiner* — Emily E Larocque
(74) *Attorney, Agent, or Firm* — Renaissance IP Law Group LLP

(57) ABSTRACT

In some embodiments, a method of quantizing an artificial neural network includes dividing a quantization range for a tensor of the artificial neural network into a first region and a second region, and quantizing values of the tensor in the first region separately from values of the tensor in the second region. In some embodiments, linear or nonlinear quantization are applied to values of the tensor in the first region and the second region. In some embodiments, the method includes locating a breakpoint between the first region and the second region by substantially minimizing an expected quantization error over at least a portion of the quantization range. In some embodiments, the expected quantization error is minimized by solving analytically and/or searching numerically.

20 Claims, 6 Drawing Sheets

(51) Int. Cl.
  *G06N 3/04*  (2023.01)
  *G06N 3/08*  (2023.01)
(58) Field of Classification Search
  CPC .............. G06F 7/483; G06F 7/49947; G06F 7/49963–49984
  See application file for complete search history.

(56) References Cited

U.S. PATENT DOCUMENTS

| | | | |
|---|---|---|---|
| 2019/0205736 A1 | 7/2019 | Bleiweiss et al. | |
| 2020/0005125 A1* | 1/2020 | Venkataramani | G06N 3/048 |
| 2020/0057934 A1* | 2/2020 | Yoo | G06K 9/6262 |
| 2021/0019630 A1* | 1/2021 | Yao | G06N 3/063 |
| 2021/0103799 A1* | 4/2021 | Venkataramani | G06N 3/063 |
| 2021/0286688 A1* | 9/2021 | Liu | G06N 3/08 |

OTHER PUBLICATIONS

R. Banner et al., Post training 4-bit quantization of convolutional networks for rapid-deployment, arXiv:1810.05723v3 [cs.CV], May 29, 2019 (later version than present on 1449) (Year: 2019).*

Banner, Ron, et al., "Post Training 4-Bit Quantization of Convolution Networks for Rapid-Deployment," Proceedings of the 35th International Conference on Machine Learning, arXiv preprint arXiv:1810.05723 (2018), 11 pages.

Choukroun, Yoni, et al., "Low-Bit Quantization of Neural Networks for Efficient Inference," ICCV Workshops, 2019, 10 pages.

Zhou, Shu-Chang, et al., "Balanced Quantization: An Effective and Efficient Approach to Quantized Neural Networks," Journal of Computer Science and Technology, 32(4), Jul. 2017, pp. 667-682.

Gupta, Suyog et al., "Deep Learning with Limited Numerical Precision", arXiv:1502.02551 [cs.LG], 2015, pp. 1-10.

Jacob, Benoit et al.,"Quantization and Training of Neural Networks for Efficient Integer-Arithmetic-Only Inference", The IEEE Conference on Computer Vision and Pattern Recognition (CVPR), 2018, pp. 2704-2713.

Jain, Shubham et al., "BiScaled-DNN Quantizing Long-tailed Datastructures with Two Scale Factors for Deep Neural Networks", 2019 56th ACM/IEEE Design Automation Conference (DAC), Jun. 2-6, 2019.

Krishnamoorthi, Raghuraman, "Quantizing deep convolutional networks for efficient inference: A whitepaper", arXiv:1806.08342 [cs.LG], Jun. 21, 2018, p. 1-36.

* cited by examiner

PIECEWISE QUANTIZATION FOR NEURAL NETWORKS

CROSS-REFERENCE TO RELATED APPLICATION

This application claims priority to, and the benefit of, U.S. Provisional Patent Application Ser. No. 62/929,752 titled "Piece-Wise Post Training Quantization of Deep Neural Networks" filed Nov. 1, 2019 which is incorporated by reference.

BACKGROUND

Artificial neural networks such as deep neural networks (DNNs) may be used for a variety of machine learning tasks such as image classification and object detection. The accuracy of a DNN may be improved by scaling up one or more dimensions such as network depth, network width, and image resolution, but this may lead to greater computational complexity and memory requirements, as well as increased energy consumption and execution time. These increased resource requirements may make it difficult to deploy DNNs in resource-constrained applications such as embedded systems and mobile devices.

Quantization techniques may be used to reduce the resource demands of DNNs by converting full-precision weights and activations into low-precision (low bit-width) representations. For example, 32-bit floating-point numbers (FP32), which are commonly used while training artificial neural networks, may be quantized by converting them to smaller 8-bit integers (INT8) which reduces the number of discrete values used to represent each number. These low bit-width numbers may occupy less space in memory and reduce the complexity, cost, and/or energy consumption of the systems that process them (whether in hardware, software, or a combination thereof). However, quantization may introduce quantization errors that reduce the performance (accuracy) of the DNN.

To minimize quantization errors and maintain the performance of a full-precision model, a quantized DNN may be trained from scratch using quantization-aware training. In another approach, a pre-trained floating-point model may be fine-tuned after quantization. Both of these approaches, however, may complicate and slow down the deployment process and may require access to the full training dataset.

In some applications, post-training quantization (PTQ) using uniform quantization with INT8 numbers may preserve near-original FP32 pre-trained model performance. However, in some applications, the resource requirements of 8-bit quantized DNNs may still be too high for more widespread deployment. Lower bit-width techniques such as 4-bit uniform PTQ may enable DNNs to be deployed in a wider range of resource-constrained applications, but the low bit-width quantization may degrade performance to an unacceptable level.

SUMMARY

A method of quantizing an artificial neural network, the method may include dividing a quantization range for a tensor of the artificial neural network into a first region and a second region, and quantizing values of the tensor in the first region separately from values of the tensor in the second region. The values of the tensor in the first region may be quantized according to a first quantization function, and values of the tensor in the second region may be quantized according to a second quantization function.

The first and second quantization functions may be different. The first and second quantization functions may be substantially the same. The first and second quantization functions may have different scale factors. Linear quantization may be applied to values of the tensor in the first region and the second region. The first region may include a positive portion and a negative portion. The second region may include a positive portion and a negative portion. The quantization range may extend from a minimum value to a maximum value of the tensor.

Dividing the quantization range may include locating a breakpoint for the first region and the second region. Locating the breakpoint may include determining a quantization error over at least a portion of the quantization range. Locating the breakpoint may include substantially minimizing the quantization error. Minimizing the quantization error may include formulating the quantization error as a function of a location of the breakpoint, formulating a first derivative of the function, and determining a value of the breakpoint that results in the first derivative being substantially zero. The value of the breakpoint that results in the first derivative being substantially zero may be determined using a binary search. The location of the breakpoint may be approximated using a regression. The quantization error may be substantially minimized using a grid search. The breakpoint may be located offline. The breakpoint may be located online. The breakpoint may be constrained to less than a midpoint of the quantization range. The breakpoint may be located to match a density of quantization values to a density of values of the tensor.

The tensor may include at least two channels that may be quantized separately in at least one of the first and second regions. The tensor may include at least two groups that may be quantized separately in at least one of the first and second regions. The method may further include correcting a bias in the quantized values of the tensor.

The tensor may include one or more weights. The tensor may include one or more activations. The artificial neural network may include a deep neural network. The first region and the second region may be non-overlapping. The tensor may include post-training values. The values of the tensor may be generated in response to a training dataset, and the quantization range of the tensor may be divided without access to the full training dataset, or with access to only a portion of the full training dataset.

A system may include a processor configured to execute procedures including dividing a quantization range for a tensor of an artificial neural network into a first region and a second region, and quantizing values of the tensor in the first region separately from values of the tensor in the second region. The processor may be further configured to execute procedures including locating a breakpoint for the first region and the second region. The processor may be further configured to execute procedures including locating the breakpoint by substantially minimizing a quantization error over at least a portion of the quantization range.

An artificial neural network apparatus may include a first accumulator configured to sum activation and weight products for a first region of a quantization range, a second accumulator configured to sum activation and weight products for a second region of the quantization range, and a third accumulator configured to sum activations for the second region. The activations for the second region may be multiplied by an offset. The first, second and third accumulators may be implemented in dedicated hardware. The first, second and third accumulators may be implemented with one or more processors configured to execute accumulation procedures.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
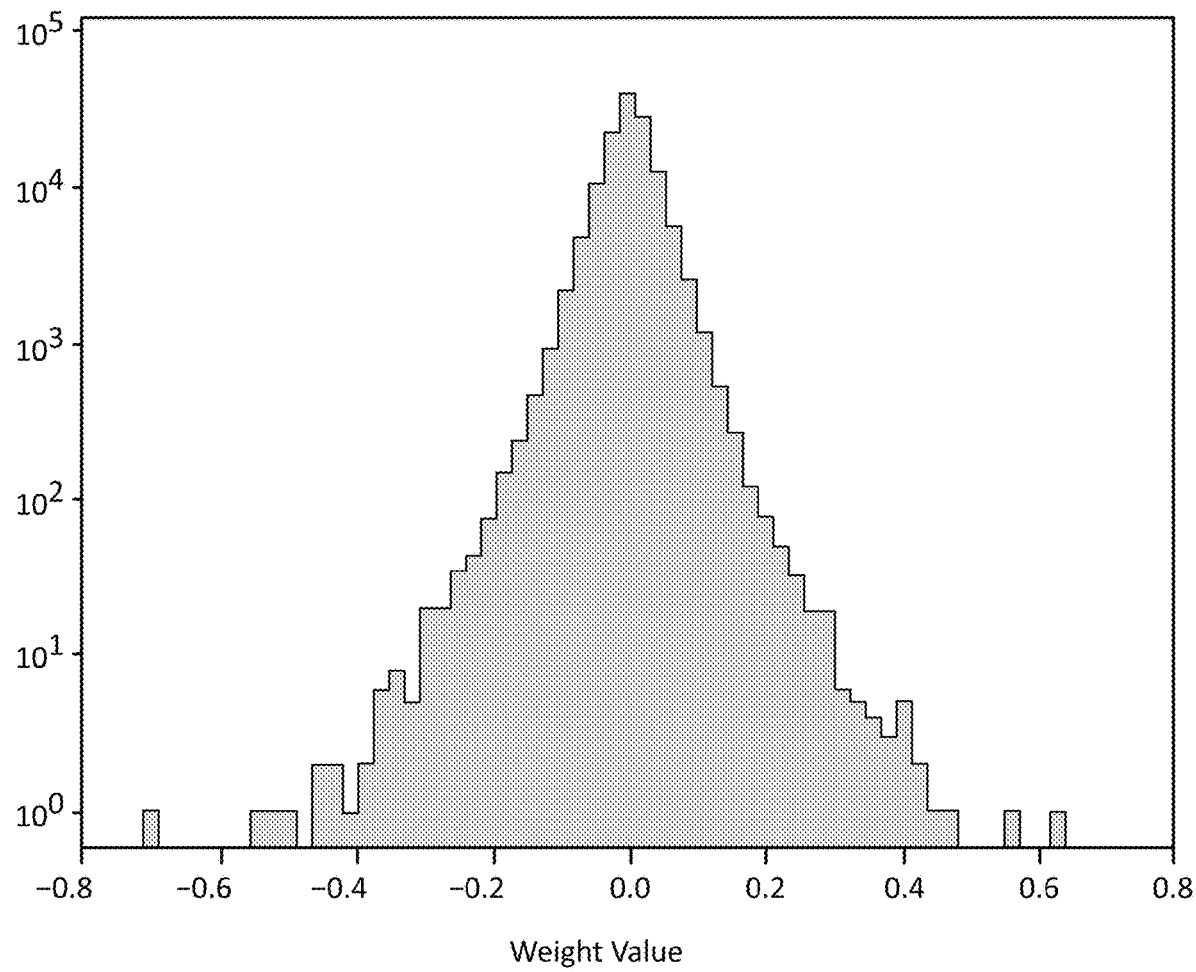
FIG. 1 Illustrates a histogram showing an example distribution of weights in a trained deep neural network.

In some artificial neural networks, distributions of weights and activations in a pre-trained model may be approximated by Gaussian and/or Laplacian functions. An example is shown in FIG. 1 which illustrates a histogram showing an example distribution of weights in a trained deep neural network (DNN). Most of the weights may be clustered around zero, while a decreasing number may be spread out in a long tail.

Figure 2:
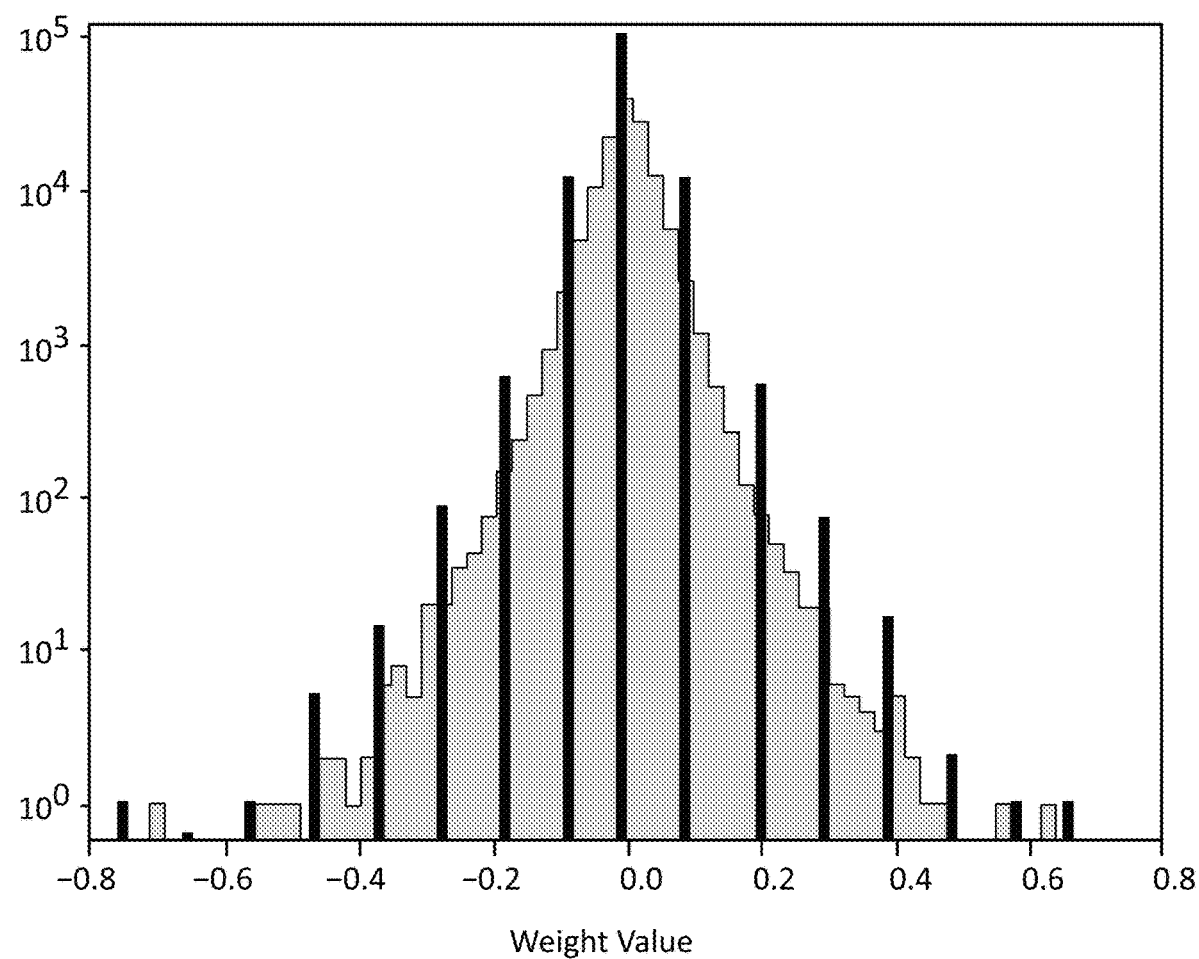
FIG. 2 Illustrates a distribution of quantization values from a 4-bit uniform post-training quantization of the weights in FIG. 1.

FIG. 2 illustrates the distribution of quantization values (shown as heavy bars) from a 4-bit uniform post-training quantization (PTQ) of the weights shown in FIG. 1. As may be apparent from FIG. 2, a uniform quantization technique may divide the quantization range evenly despite the non-uniform distribution of weights. Thus, especially in a low bit-width regime, a uniform quantization scheme may assign too few quantization levels to values with small magnitudes, of which there are many, and relatively too many quantization levels to values with large magnitudes, of which there are relatively few. This may degrade the performance of the model by, for example, increasing the quantization error and reducing the accuracy of the results.

In an artificial neural network according to some of the principles of this disclosure, a quantization range of a tensor, such as a weight, may be divided into two or more regions which may be quantized separately. For example, a piecewise linear quantization technique may divide the quantization range of a post-training weight distribution into two non-overlapping regions and apply uniform quantization to each region as shown in FIG. 3.

Figure 3:
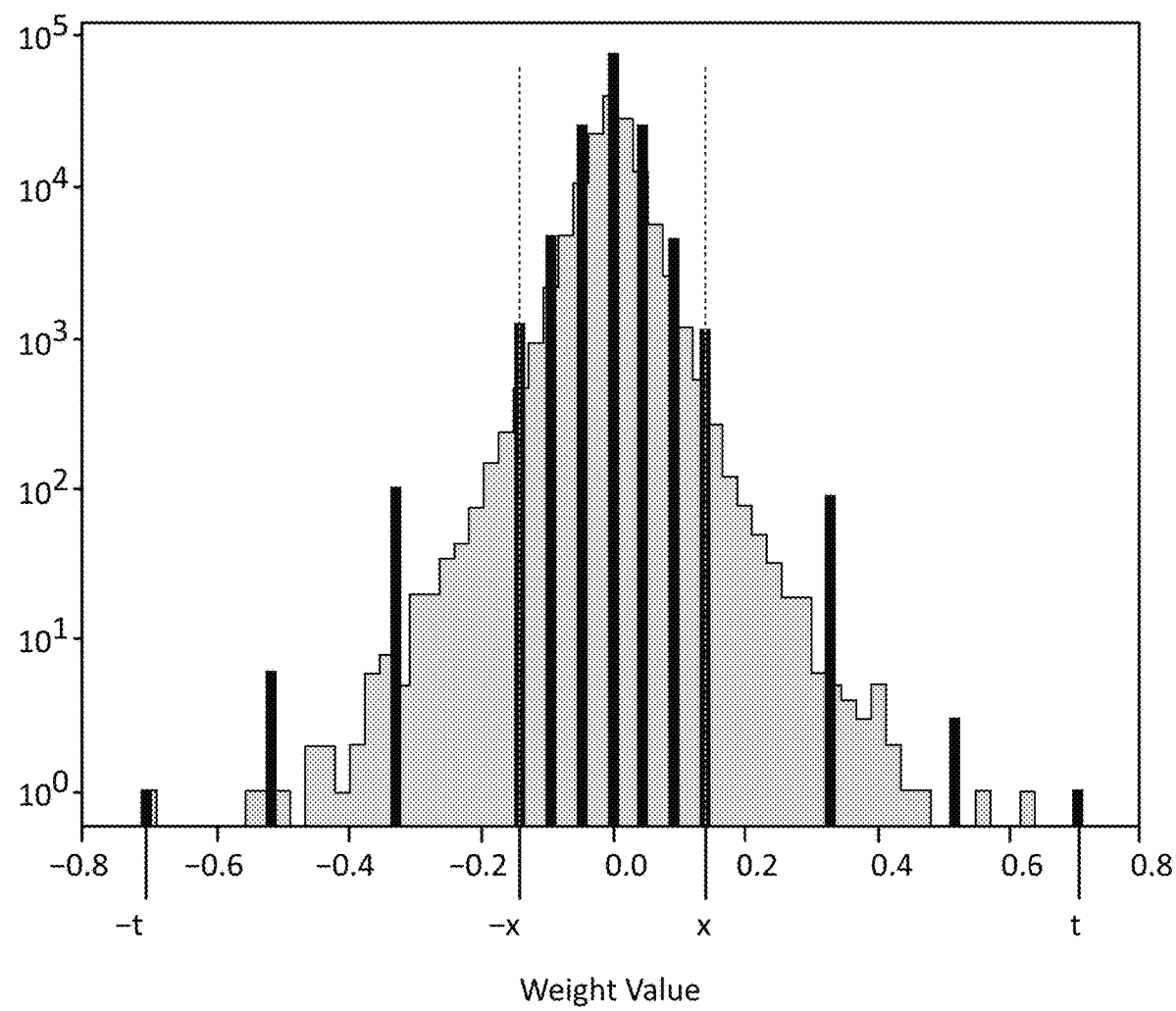
FIG. 3 Illustrates a distribution of quantized values from a piecewise linear post-training quantization according to this disclosure.

FIG. 3 illustrates a distribution of quantized values (shown as heavy bars) from a piecewise linear post-training quantization according to this disclosure as applied to the weighs shown in FIG. 1. The height of each heavy bar in FIG. 3 may represent the number of weight samples that were quantized at that weight value.

The quantization range $[-t, t]$ may be divided into two regions, each having a positive portion and a negative portion. Region 1 may include a negative portion $[-x, 0]$ and a positive portion $[0, x]$. Region 1 may be represented as $[-x, 0] \cup [0, x]$ or alternatively as $[-x, x]$. Region 2 may include a negative portion $[-t, -x]$ and a positive portion $[x, t]$. Region 2 may be represented as $[-x, 0] \cup [0, x]$. For convenience, the two portions of each of the two regions may also be referred to collectively or individually as the four pieces $[-t, -x]$, $[-x, 0]$, $[0, x]$ and $[x, t]$ of the quantization range.

The breakpoint x between Region 1 and Region 2 may be shown as a dashed line at $-x$ and $x$, and 2-bit uniform quantization may be used within each piece. Thus, there may be four quantized values in each piece, and a total of 16 quantized values over the entire quantization range.

The heavy bar at $-x$ may include two co-located bars: one at the upper end of piece $[-t, -x]$ and one at the lower end of piece $[-x, 0]$. Likewise, the heavy bars at 0 and x may each include two co-located bars at the ends of adjacent pieces of the quantization range.

As may be apparent from FIG. 3, the quantization values may be more dense in the region $[-x, x]$ (Region 1), where the distribution of weights is more dense. Likewise, the quantization values may be less dense in the region $[-x, 0] \cup [0, x]$ (Region 2), where the distribution of weights is less dense. Depending on the implementation details, this density matching may enable the piecewise linear PTQ technique illustrated in FIG. 3 to provide better performance (e.g., a lower quantization error) than the uniform PTQ technique illustrated in FIG. 2, even though both techniques may use the same number of quantization values.

Moreover, depending on the implementation details, a piecewise quantization technique according to the principles of this disclosure may provide one or more additional benefits such as higher speed, lower power consumption, reduced memory requirements, lower complexity and/or cost of hardware and/or software, reduced die area on integrated circuits, implementation with little or no modification to commodity hardware, etc. For example, the uniform quantization scheme illustrated in FIG. 2 may require 4-bit addition, multiplication, accumulation, etc., whereas the piecewise quantization technique illustrated in FIG. 3 may only require 2-bit arithmetic for at least a portion of the pipeline which may be faster, more efficient, etc. Moreover, depending on the implementation details, some or all of these benefits may be realized without access to the full training dataset.

In some embodiments, the performance of a piecewise quantized model may depend on the value of one or more breakpoints (e.g., x in the embodiment of FIG. 3) which may be placed at or near one or more optimal locations to reduce or minimize the quantization error. The principles of this disclosure also encompass techniques for locating one or more optimal breakpoints. These techniques may include: formulating the quantization error as function of a breakpoint and solving analytically for a zero derivative, approximating an optimal breakpoint with a linear approximation, and/or conducting a grid search, all of which are described in more detail below.

The embodiment illustrated in FIG. 3 may be modified in myriad ways and configured and/or adapted for use in countless applications in accordance with the principles of this disclosure. Some of the possible modifications and/or applications are as follows.

In some embodiments, any bit-width may be used to quantize any or all of the regions, and/or portions thereof, of a quantization range. Different bit-widths may be used for different regions and/or portions thereof, as well as different layers and/or nodes within a layer of an artificial neural network.

In some embodiments, piecewise quantization may be applied to any tensor or combination of tensors of an artificial neural network including weights, activations (including before and after application of an activation function), and any other tensor or values that may be quantized. Any of the tensors may be signed or unsigned. Piecewise quantization may be applied to any tensor or combination of tensors having any distribution of values at any location in an artificial neural network. This may include, for example, tensors having any generally bell-shaped or normal distribution such as a Gaussian or Laplacian distribution, which may generally have long tails. Piecewise quantization may be applied to tensors having distribution of values that are uniform or non-uniform, symmetric or asymmetric, etc.

In some embodiments, piecewise quantization may be applied to any type of artificial neural network including deep neural networks, convolutional neural networks, feed-forward neural networks, etc.

In some embodiments, piecewise quantization may be used with any quantization function, or combination thereof, including uniform or linear, and nonlinear quantization, affine or non-affine quantization, etc. Different quantization functions may be used for different regions, and/or portions thereof, of a quantization range. Piecewise quantization may be applied per-layer, per-channel, per-group, or any variation or combination thereof.

In some embodiments, a quantization range may be divided into any number of regions and/or portions thereof, and may have any number of breakpoints between regions, and/or portions thereof. The regions and/or portions thereof may be symmetric or asymmetric, balanced or unbalanced. The regions and/or portions thereof may have only negative values, only positive values, or a combination thereof. A quantization range used for quantization may span the entire (minimum to maximum) value range of a tensor, or may only cover one or more portions of the entire value range of a tensor. A quantization range may be divided into regions and/or portions thereof that are overlapping or non-overlapping, contiguous or non-contiguous (touching or spaced apart), or any combination thereof. Depending on the implementation details, for example, the use of non-overlapping regions and/or portions thereof, may improve the accuracy of a model using piecewise quantization according to this disclosure.

In some embodiments, quantization may be applied separately to each region, or portion thereof, of a quantization range. In some embodiments, operations and/or apparatus may be combined to fully or partially combine quantization in more than one region or portion thereof.

In some embodiments, piecewise quantization may be implemented online (in real-time) or offline, or in any combination thereof. Piecewise quantization may be implemented post-training, pre-training, during tuning or re-training after an initial training, during a quantization-aware training, or any combination thereof. In some embodiments, piecewise quantization according to this disclosure may be implemented without access to the full training dataset that may have been used to generate the distribution of tensor values. In some embodiments, some or all of the training dataset may be used. For example, a small portion of the training dataset may be used to profile a range of activation functions.

In some embodiments, piecewise quantization may be implemented in hardware, software, or any combination thereof.

In some embodiments, piecewise quantization may be implemented with affine quantization in one or more regions of a quantization range or portions thereof. In some embodiments, affine quantization may involve quantization parameters such as a scale factor and an offset or zero-point.

In some embodiments, quantization may be characterized by $$x_q = \text{round}\left(\frac{x - x_{min}}{S}\right) * S + x_{min} \quad \text{(Eq. 1)}$$

where $x_q$ may be the quantized output value, x may be an input floating point value, $x_{min}$ may be a floating point value at the minimum end of the quantization region, and S may be a scale factor given by $$S = \frac{x_{max} - x_{min}}{N_{levels} - 1} \quad \text{(Eq. 2)}$$

where $x_{max}$ may be the floating point value at the maximum end of the quantization region, $N_{levels}=2^b$, and b may be the bit-width used for quantization.

In the case of symmetric quantization, $x_{max}$ may be given by:

$$x_{max} = -x_{min} = \max(|x|) \quad \text{(Eq. 3)}$$

and in the case of asymmetric quantization, $x_{max}$ may be given by:

$$x_{max} = \max(x) \quad \text{(Eq. 4A)}$$

$$x_{min} = \min(x) \quad \text{(Eq. 4B)}$$

where x may be an array of the input floating point values.

Although the inventive principles are not limited to the use of any particular type of quantization, the use of an affine quantization technique such as the example described above with reference to Eq. 1 may provide one or more advantages depending on the implementation details. This may be understood with reference to some alternative implementation techniques. For example, one possible technique for implementing quantization may be to use fixed-point representations of numbers. However, using fixed-point numbers may impose limits on the smallest and/or largest numbers that may be represented, and may also impose limits on options for selecting breakpoints and/or scale factors. Any of these limitations may reduce the accuracy of the model and/or results. For example, the use of fixed-point numbers may limit the smallest and/or largest values that may be represented, and/or the breakpoints and/or scale factors, to values that may be equal to $2^N$ where N may be a positive or negative integer. In contrast, the use of the quantization technique described above with reference to Eq. 1 may enable the use of floating point or other more flexible number representations for scale factors, offsets or zero-points, breakpoints, etc., and may also enable the representation of smaller numbers, wider ranges of numbers, etc. Depending on the implementation details, any of these factors may improve the accuracy of a model and/or results, as well as other performance metrics.

A further potential advantage of a quantization technique such as the example described above with reference to Eq. 1 it that it may facilitate the implementation of non-overlapping quantization regions. For example, in some embodiments, by placing $x_{min}$ at the minimum end of a piecewise quantization region for higher values, none of the quantization resolution may be wasted on values lower than $x_{min}$, which may be quantized as part of a separate region for lower values.

Figure 4:
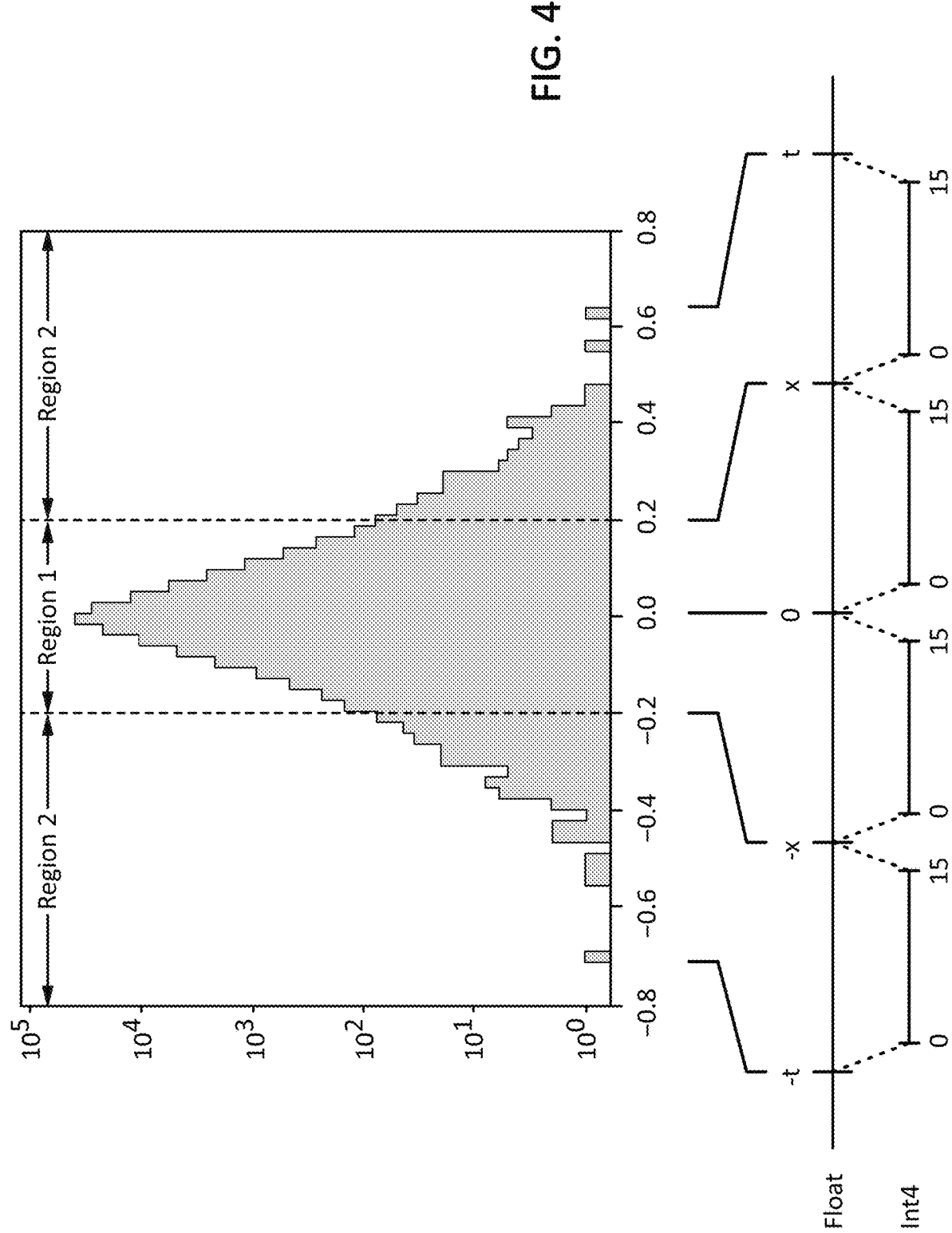
FIG. 4 Illustrates an embodiment of a piecewise quantization technique according to this disclosure.

FIG. 4 illustrates another embodiment of a piecewise quantization technique according to this disclosure. The embodiment of FIG. 4 illustrates how floating point representations of weight values within the entire quantization range [−t, t] (shown as a continuous horizontal line) may be mapped to four different 4-bit (INT4) quantized values in the four pieces [−t, −x], [−x, 0], [0, x] and [x, t] of the quantization range.

In some embodiments, an optimal breakpoint may be found by minimizing the expected quantization error. For example, in an embodiment having a Gaussian distribution of weights and a quantization range [−t, t] divided into two regions (each region having a positive portion and negative portion), the weight distribution may be divided into four pieces [−t, −x], [−x, 0], [0, x] and [x, t]. Each piece may have $N_{levels}$ number of levels (values) to represent the quantized values of floating point weights. The Gaussian probability density function (PDF) may be given by $$f(x) = \frac{1}{\sqrt{2\pi}} e^{-\frac{x^2}{2}} \quad \text{(Eq. 5)}$$

and the cumulative distribution function (CDF) may be given by $$F(x) = \int_{-\infty}^{x} f(s) ds \quad \text{(Eq. 6)}$$

Then, the expected quantization error may be given by $$E(x, t) = \int_{-\infty}^{+\infty} f(s)(s - s_q)^2 ds = \quad \text{(Eq. 7)}$$
$$C[(F(x) - F(-x)) * x^2 + (F(-x) + 1 - F(x)) * (t - x)^2]$$

where C may be a constant given by $$C(b) = \frac{1}{12(2^b - 1)^2} \quad \text{(Eq. 8)}$$

and where b may be the bit-width used for quantization.

The first derivative of Eq. 7 may be given by $$D(x,t) = x + 2t*(F(x)-1) - f(x)*(t^2 - 2tx) \quad \text{(Eq. 9)}$$

which, if solved for 0, may provide an optimal breakpoint.

D (x, t) may be monotonically increasing such that $$D(0, t) = -t - \frac{t^2}{2} < 0 \quad \text{(Eq. 10)}$$

and $$D(t, t) = t + f(t)*t^2 > 0 \quad \text{(Eq. 11)}$$

Thus, there may exist a unique optimal breakpoint $x_{opt}$ such that $$D(x_{opt}, t) = 0 \quad \text{(Eq. 12)}$$

which may minimize the quantization error.

Depending on the implementation details, the quantization error $E(x_{opt}, t)$ for a piecewise uniform (linear) quantization technique according to this disclosure may be smaller than the quantization error for a uniform quantization process that uses the same number of quantization levels. For example, a piecewise quantization technique that uses 4-bit quantization on each of four pieces of a quantization range according to this disclosure may have a smaller quantization error smaller than a conventional quantization process that applies uniform 6-bit quantization over the same quantization range.

One approach to solving the equation D(x, t)=0 to locate an optimal breakpoint according to this disclosure is to solve it numerically using a binary search, for example, with complexity O(log t). Depending on the implementation details, this approach may provide highly accurate results, and may be particularly suitable in implementations where quantization may be performed offline, for example, when quantizing weights.

Another approach to solving the equation D(x, t)=0 according to this disclosure is to approximate an optimal breakpoint using linear regression with O(1) complexity. This may be accomplished, for example, by first determining the maximum over standard deviation of weights (or other tensor) to estimate a normalized quantization range [−t, t]. Then, a binary search may be used to find optimal breakpoints based on the normalized quantization range. The binary search results may then be used to find linear approximations for one or more optimal breakpoints. In one example embodiment, an approximate optimal breakpoint value $x_{app}$ may be determined through this approximation using $$x_{app}(t)/t = \ln(0.8614*t + 0.6079) \quad \text{(Eq. 13)}$$

for a Gaussian weight distribution and a perturbation $|x_{app} - x_{opt}| < 0.05$. Depending on the implementation details, this approach, which may be considered a one-shot approach, may reduce the time required to determine an optimal breakpoint while resulting in little, if any degradation of the quantization error. Thus, the approximation approach may be beneficial in implementations using online or on-the-fly quantization, such as with activations. This approach may be used with distributions other than Gaussian. For example, with a Laplacian distribution, a value of $x_{app}$ may be determined using $$x_{app}(t)/t = 0.8030 * \sqrt{t} - 0.3167 \quad \text{(Eq. 14)}$$

where the distribution may be normalized.

Another approach to solving the equation D(x, t)=0 according to this disclosure is to use a coarse-to-fine grid search, which may not require any assumptions about the distribution of the tensor values. In one example embodiment, a three-stage grid search may use the following stages to search for a ratio of optimal breakpoint over the maximum value of a tensor to minimize the quantization error:

Stage 1: search best ratio r1 in np.arange(0.1, 1.0, 0.1)
Stage 2: search best ratio r2 in np.arange(r1−0.05, r1+0.05, 0.01)
Stage 3: search best ratio r3 in np.arange(r2−0.005, r1+0.005, 0.001)

where np is a NumPy operator.

Depending on the implementation details, a grid search approach may provide highly accurate results, and may be particularly suitable in implementations where quantization may be performed offline. A potential benefit of a coarse-to-fine grid search approach is that it may reduce and/or minimize a quantization error directly without the need for any specific knowledge of, and/or assumptions about, the distribution of the tensor values.

Table 1 lists some example pseudocode for implementing a coarse-to-fine grid search to locate a breakpoint according to this disclosure.

TABLE 1

Input: A tensor T to be quantized
Output: Optimal breakpoint Xopt
1   Xopt = 0:5, t = max(abs(T))
2   for stage in [1,2,3] do
3   |   grid = 0:1$^{stage}$
4   |   range = 5 if stage==1 else 10
5   |   start = Xopt/t − grid * range
6   |   end = Xopt/t + grid * range
7   |   for Xopt/m in [start: grid: end] do
8   |   |   Apply piecewise linear quantization scheme
9   |   |   Compute quantization error (mean squared error)
10  |   |   Select Xopt/t having smallest quantization error In some embodiments, when locating a breakpoint for piecewise quantization of a tensor having a generally bell-shaped distribution according to this disclosure, the highest density of values may generally be clustered around zero. Thus, it may be beneficial to constrain the breakpoint to less than the midpoint of the quantization range (e.g., $x_{opt} < t/2$) which may be helpful in finding an optimal breakpoint using analytical techniques, searching techniques and/or any other techniques to locate a breakpoint by reducing or minimizing quantization error. In some embodiments, the quantization error may be reduced or minimized by evaluating the quantization error over the entire quantization range. In some other embodiments, the quantization error may be reduced or minimized by evaluating the quantization error over a portion of the quantization range, and/or any or all of the regions and/or pieces into which the range may be divided.

As mentioned above, a quantization range may be divided into any number of regions and/or portions thereof, and may have any number of breakpoints between regions, and/or portions thereof. In some embodiments having multiple breakpoints, any of the techniques discussed above may be extended to find one or more optimal breakpoint values. For example, in some embodiments, multiple optimal breakpoint values may be determined by minimizing the expected quantization error given in Eq. 7 as applied to multiple breakpoints. As another example, a coarse-to-fine grid search may also be extended to locate multiple breakpoints. In some embodiments, determining a number and/or location of optimal breakpoints may involve balancing various considerations. For example, depending on the implementation details, utilizing multiple breakpoints may provide a significant improvement in accuracy. In other implementations, however, the improvement in accuracy provided by multiple breakpoints may be outweighed by extra hardware and/or software execution time that may be needed to implement the additional breakpoints.

Although the inventive principles of this disclosure may not require the use of any specific technique to find one or more optimized breakpoints, any of the analytical, approximation, and/or searching techniques disclosed herein may provide a more easily analyzable, extendable, and/or robust solution.

In some embodiments, piecewise quantization may be implemented with dedicated hardware according to this disclosure. In a hardware implementation, piecewise quantization may divide a tensor range into two or more regions, each of which may be implemented with separate computation paths, for example, to accommodate different scaling factors and/or offsets. In an example embodiment implementing piecewise linear quantization such as that illustrated in FIG. 3, a hardware implementation may include some hardware similar to that used for uniform quantization within each region and/or portion thereof (e.g., pieces of the quantization range), while adding some additional apparatus to accommodate the piecewise arrangement. For example, the uniform quantization within each piece may be implemented with two accumulators: one to sum activation and tensor (e.g., weight) products, and one to sum activations. One additional accumulator may be included to sum activations that may be multiplied by a non-zero offset in regions or pieces that may be offset from zero (e.g., in Region 2).

Thus, in some embodiments, a hardware implementation of a piecewise quantization technique according to this disclosure may include any or all of the following: adders and multipliers similar to those used for uniform quantization; three accumulation registers (one for the sum of products in each of two calculation paths, and a third for activations in the path that processes the non-zero offsets); and one or two extra bits of storage per tensor (one to indicate sign and one to indicate the region in which the tensor value was quantized). The bit to indicate sign may not be included in implementations with unsigned values. The bit to indicate region may not be included in multiply-accumulate (MAC) computations as it may only be used to find the appropriate accumulators. Thus, in some embodiments, a hardware implementation of a piecewise quantization technique according to this disclosure may be realized with minimal modification to commodity hardware.

Figure 5:
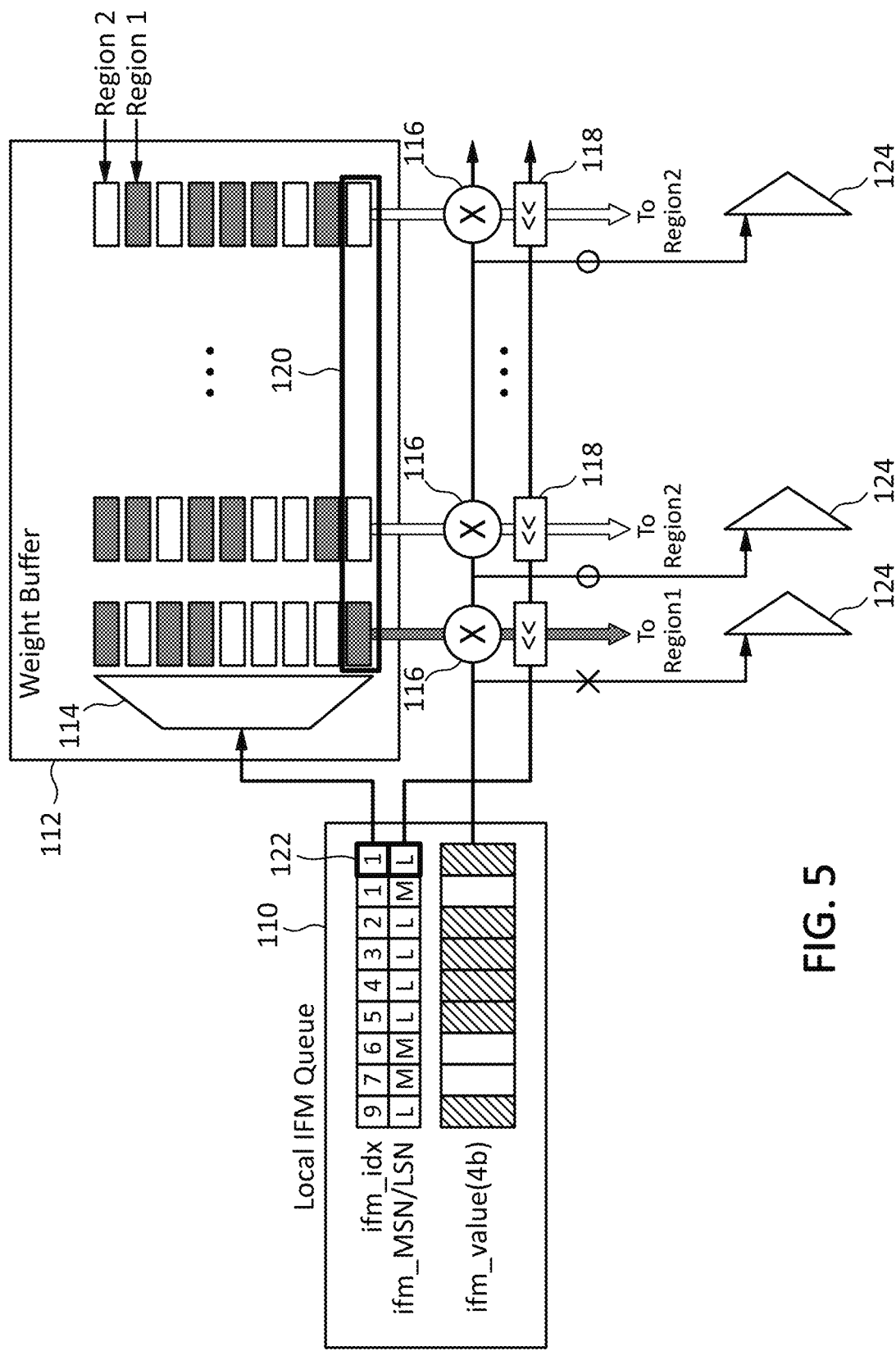
FIG. 5 Illustrates an embodiment of an apparatus for processing piecewise quantized values in an artificial neural network according to this disclosure.

FIG. 5 Illustrates an embodiment of an apparatus for processing piecewise quantized values in an artificial neural network according to this disclosure. In the embodiment of FIG. 5, a weight buffer 112 may include columns of 4-bit quantized weight values, each of which may be accompanied by an index bit to indicate whether it has been quantized in Region 1 (gray) or Region 2 (white). Any number of columns may be used to provide parallel processing of multiple values, and the columns may have any suitable depth. In this example, the columns are nine weights deep. A local input feature map (IFM) queue 110 may provide a stream of 4-bit quantized values (ifm_value), each of which may be accompanied by a most significant nibble/least significant nibble bit (ifm_MSN/LSM) to indicate which region it is associated with. An IFM index (ifm_idx) associated with each value (ifm_value) in the local IFM queue 110 may use selector 114 (in this example, a 1-of-9 selector) to select a brick 120 of weights to be multiplied with the value (ifm_value) from the local IFM queue 110 by 4-bit multipliers 116. The partial products may be shifted by four bits in shift registers 118 depending on the state of the ifm_MSN/LSM bit. Thus, each brick 120 of weights is associated with a corresponding set 122 of values of the IFM index (ifm_idx) and nibble bit (ifm_MSN/LSM). An offset adder tree 124, which may be associated with each column, may add up activations if the weight in its corresponding column belongs to Region 2. In the example state illustrated in FIG. 5, the first column may be associated with Region 1, and therefore, the corresponding offset adder tree 124 for the first column is disabled as indicated by the X. In contrast, the second and last columns may be associated with Region 2, and therefore, the corresponding offset adder trees 124 for the second and last columns are enabled as indicated by the circles.

The principles of this disclosure relating to piecewise quantization may be combined with other quantization techniques, thereby creating additional embodiments that may produce synergistic results. For example, an embodiment that implements piecewise uniform (linear) quantization may implement bias correction within each piece, individually or collectively, of the quantization range. In such an embodiment, a bias in the quantized values of the tensor may be corrected, for example, by folding one or more correction terms into a scale and/or offset for one or more of the pieces of the quantization range. Depending on the implementation details, the combination of piecewise quantization bias correction may further reduce quantization error and improve the performance of the artificial neural network in which it is implemented.

As another example, an embodiment that implements piecewise uniform (linear) quantization according to this disclosure may apply individual quantization per output channel filter, for one or more of the pieces of the quantization range. This technique may be further extended according to this disclosure to decomposing one or more output channel filters into one or more groups, which may be quantized separately, for one or more of the pieces of the quantization range. Depending on the implementation details, a combination of piecewise quantization with per-channel and/or per-group may further reduce quantization error and improve the performance of an artificial neural network. In some embodiments, changing from one group to another may include changing a scale factor. Depending on the implementation details, applying piecewise quantization on a per-channel basis (or channel-wise) may improve accuracy over a per-layer (or layer-wise) implementation.

Any or all of the methods and/or apparatus described in this disclosure may be deployed in any applications that may use artificial neural networks. By way of example, an artificial neural network implementing piecewise quantization according to this disclosure may be deployed in devices for mobile computing, Internet of Things (IOT), and/or embedded applications, including devices that may be configured to use an artificial neural network implementing piecewise quantization for image classification, facial recognition, speech recognition, semantic segmentation, autonomous driving, robot control, and other applications. Artificial neural networks implementing piecewise quantization according to this disclosure may also be deployed in desktop/workstation applications, servers, datacenters, including hyper scaling data center, etc.

Figure 6:
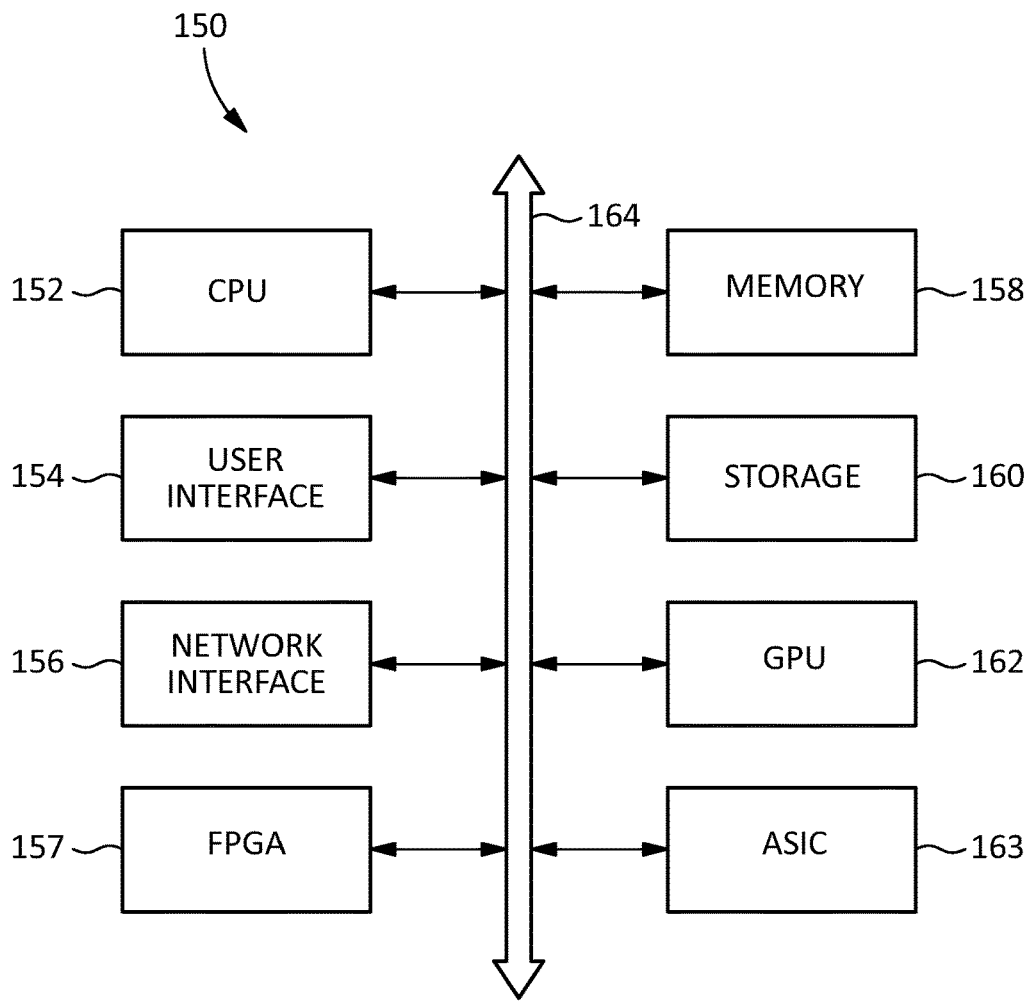
FIG. 6 Illustrates an embodiment of a computing system that may be used to implement any or all of the methods and/or apparatus described in this disclosure.

FIG. 6 illustrates an embodiment of a computing system according to this disclosure. The system 150 of FIG. 6 may be used to implement any or all of the methods and/or apparatus described in this disclosure. The system 150 may include a central processing unit (CPU) 152, a user interface 154, a network interface 156, memory 158, storage 160, a GPU 162, a field programmable gate array (FPGA) 157 and an application specific integrated circuit (ASIC) 163. However, the principles of this disclosure are not limited to implementation with any of the components illustrated in FIG. 6 but may be realized with any suitable hardware, software or combinations thereof. In different embodiments, the system may omit any of these components or may include duplicates, or any additional numbers of, any of the components, as well as any other types of components to implement any of the methods and/or apparatus described in this disclosure.

The CPU 152 may include any number of cores, caches, bus and/or interconnect interfaces and/or controllers. The memory 158 may include any arrangement of dynamic and/or static RAM, nonvolatile memory (e.g., flash memory) etc. The storage 160 may include hard disk drives (HDDs), solid state drives (SSDs), and/or any other type of data storage devices or any combination thereof. The user interface 154 may include any type of human interface devices such as keyboards, mice, monitors, video capture or transmission devices, microphones, speakers, touchscreens, etc. as well as any virtualized or remote versions of such devices. The network interface 156 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc. The GPU 162, FPGA 157 and ASIC 163 may include specialized hardware such as programmable multiply-accumulate (MAC) hardware which may be configured to efficiently implement any or all of the quantization and/or other neural network processing disclosed herein.

Any or all of the components of the system 150 may be interconnected through a system bus 164 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 150 may also include various chipsets, interfaces, adapters, glue logic, embedded controllers, such as programmable or non-programmable logic devices or arrays, ASICs, embedded computers, smart cards, and the like, arranged to enable the various components of the system 150 to work together to implement any or all of the methods and/or apparatus described in this disclosure. Any of the components of the system 150 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

Figure 7:
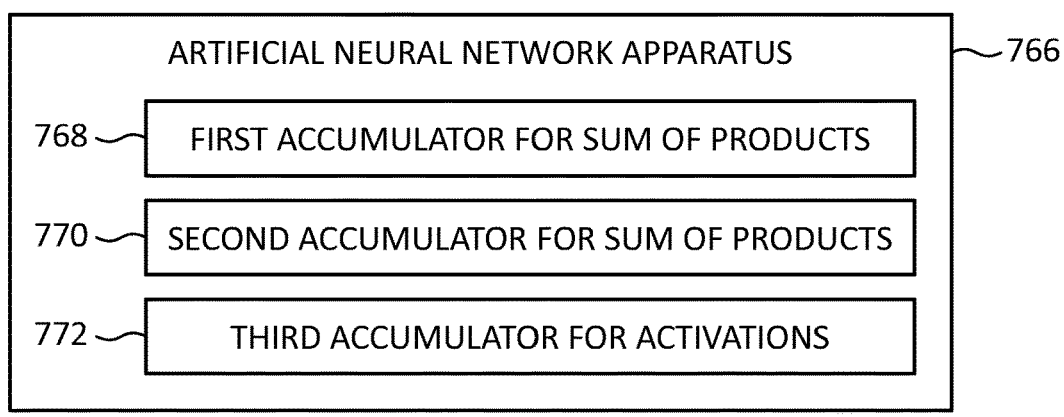
FIG. 7 illustrates an embodiment of an artificial neural network apparatus according to this disclosure.

FIG. 7 illustrates an embodiment of an artificial neural network apparatus according to this disclosure. An artificial neural network apparatus 766 may include a first accumulator 768 configured to sum activation and weight products for a first region of a quantization range, a second accumulator 770 configured to sum activation and weight products for a second region of the quantization range, and a third accumulator 770 configured to sum activations for the second region.

The parts or steps of a method or algorithm and functions described in connection with the embodiments disclosed herein may be embodied directly in hardware, in one or more software modules executed by a processor, or in a combination of the two, including in the system 150. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system. Any system disclosed herein, or component or portion thereof, may be implemented as its own software stack.

The embodiments disclosed above have been described in the context of various implementation details, but the principles of this disclosure are not limited these or any other specific details. For example, some functionality may have been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A system, comprising:
a weight buffer configured to store weight values and a first index value associated with each respective weight value, each first index value indicating a type of quantizing applied to a corresponding weight value, the weight values being arranged in at least one column of the weight buffer;
an activation buffer configured to store activation values, a second index value associated with each respective activation value, and a bit-range indicator associated with each respective activation value;
a selector circuit configured to select a weight value in each column of the weight buffer corresponding to the second index value of a current activation value;
a multiplier circuit corresponding to each respective column of the weight buffer, the multiplier circuit configured to multiply the current activation value and the weight value selected corresponding to the second index value of the current activation value;
a shift-register circuit coupled to an output of the multiplier circuit, the shift-register circuit being configured to shift the output of the multiplier circuit based on the bit-range indicator associated with the current activation value; and
an adder-tree circuit coupled to an output of the shift-register circuit, the adder-tree circuit being configured to be enabled or disabled to add the output of the shift-register circuit based on the first index value of the weight value selected in the column of the weight buffer.

2. The system of claim 1, wherein the bit-range indicator indicates whether the activation value associated with the bit-range indicator comprises a most-significant nibble or a least-significant nibble of the activation value.

3. The system of claim 1, wherein the first index value associated with a weight value indicates whether the weight value is within a predetermined weight-value range of multiple weight-value ranges spanning a distribution of the weight values.

4. The system of claim 3, wherein the distribution of the weight values comprises a generally bell-shaped distribution or a normal distribution.

5. The system of claim 3, wherein the weight values comprise quantized values.

6. The system of claim 5, wherein the first index value associated with a weight value corresponds to a predetermined quantizing technique applied to the weight value.

7. The system of claim 6, wherein the predetermined quantizing technique comprises at least one of a uniform quantizing technique, a linear quantizing technique, a non-linear quantizing technique, an affine quantizing technique, and a non-affine quantizing technique.

8. The system of claim 5, wherein a breakpoint between value ranges of the distribution of weight values is based on a minimum of an expected quantizing error of a quantizing technique used to quantize the weight values.

9. The system of claim 1, wherein the activation values comprise quantized second values, each activation value being quantized using a predetermined quantizing technique based on the activation value being within a predetermined activation-value range of multiple activation value ranges spanning a distribution of the activation values.

10. The system of claim 9, wherein the predetermined quantizing technique comprises at least one of a uniform quantizing technique, a linear quantizing technique, a non-linear quantizing technique, an affine quantizing technique, and a non-affine quantizing technique.

11. A system, comprising:
a first buffer configured to store first values and a first index value associated with each respective first value, each first index value indicating a type of quantizing applied to a corresponding first value, the first values being arranged in at least one column of the first buffer;
a second buffer configured to store second values, a second index value associated with each respective second value, and a bit-range indicator associated with each respective second value;
a selector circuit configured to select a first value in each column of the first buffer corresponding to the second index value of a current second value;
a multiplier circuit corresponding to each respective column of the first buffer, each multiplier circuit configured to multiply the current second value and the first value selected corresponding to the second index value of the current second value;
a shift-register circuit coupled to an output of the respective multiplier circuit, the shift-register circuit being configured to shift the output of the multiplier circuit based on the bit-range indicator associated with the current second value; and an adder-tree circuit coupled to an output of the shift-register circuit, the adder-tree circuit being configured to be enabled or disabled to add the output of a corresponding shift-register circuit based on the first index value of the first value selected in the column of the first buffer.

12. The system of claim 11, wherein the bit-range indicator indicates whether the second value associated with the bit-range indicator comprises a most-significant nibble or a least-significant nibble of the second value.

13. The system of claim 11, wherein the first index value associated with a first value indicates whether the first value is within a predetermined value range of multiple value ranges spanning a distribution of first values.

14. The system of claim 13, wherein the distribution of first values comprises a generally bell-shaped distribution or a normal distribution.

15. The system of claim 13, wherein the first values comprise quantized values.

16. The system of claim 15, wherein the first index value associated with a first value corresponds to a predetermined quantizing technique applied to the first value.

17. The system of claim 16, wherein the predetermined quantizing technique comprises at least one of a uniform quantizing technique, a linear quantizing technique, a non-linear quantizing technique, an affine quantizing technique, and a non-affine quantizing technique.

18. The system of claim 17, wherein a breakpoint between value ranges of the distribution of first values is based on a minimum of an expected quantizing error of a quantizing technique used to quantize the first values.

19. The system of claim 11, wherein the second values comprise quantized second values, each second value being quantized using a predetermined quantizing technique based on the second value being within a predetermined second-value range of multiple second-value ranges spanning a distribution of the second values.

20. The system of claim 19, wherein the predetermined quantizing technique comprises at least one of a uniform quantizing technique, a linear quantizing technique, a non-linear quantizing technique, an affine quantizing technique, and a non-affine quantizing technique.

* * * * *